US012789019B2

(12) United States Patent
Chaney et al.

(10) Patent No.: US 12,789,019 B2
(45) Date of Patent: Nov. 10, 2026

(54) FACEMASK WITH VIBRATING ALERT DEVICE

(71) Applicant: SCOTT TECHNOLOGIES, INC., Monroe, NC (US)

(72) Inventors: Kevin A. Chaney, Albemarle, NC (US); Matthew Shannon, Salisbury, NC (US); Richard J. Sabacinski, Charlotte, NC (US); Craig M. Parkulo, Midland, NC (US); Wesley M. Barbee, Oxboro, NC (US)

(73) Assignee: SCOTT TECHNOLOGIES, INC., Monroe, NC (US)

( * ) Notice: Subject to any disclaimer, the term of this patent is extended or adjusted under 35 U.S.C. 154(b) by 583 days.

(21) Appl. No.: 18/273,348

(22) PCT Filed: Jan. 18, 2022

(86) PCT No.: PCT/IB2022/050406

§ 371 (c)(1),
(2) Date: Jul. 20, 2023

(87) PCT Pub. No.: WO2022/167881

PCT Pub. Date: Aug. 11, 2022

(65) Prior Publication Data

US 2024/0307712 A1 Sep. 19, 2024

Related U.S. Application Data

(60) Provisional application No. 63/144,800, filed on Feb. 2, 2021.

(51) Int. Cl.
*A62B 9/00* (2006.01)
*A62B 7/02* (2006.01)
*A62B 18/10* (2006.01)

(52) U.S. Cl.
CPC ................ *A62B 9/006* (2013.01); *A62B 7/02* (2013.01); *A62B 18/10* (2013.01)

(58) Field of Classification Search
CPC ............ A62B 9/006; A62B 7/02; A62B 18/10
See application file for complete search history.

(56) References Cited

U.S. PATENT DOCUMENTS 3,719,160 A 3/1973 Christianson
3,957,044 A 5/1976 Fletcher et al.
(Continued)

FOREIGN PATENT DOCUMENTS

CN 203761300 U 8/2014
CN 204502174 U 7/2015
(Continued)

OTHER PUBLICATIONS

"3M™ Scott™ Ska-Pak AT", 3M Scott Fire & Safety, 2018, pp. 1-2.
(Continued)

*Primary Examiner* — Timothy A Stanis
*Assistant Examiner* — Alec R Wahl
(74) *Attorney, Agent, or Firm* — Weisberg I.P. Law, P.A.

(57) ABSTRACT

A self-contained breathing apparatus (SCBA) facemask with a mask-mounted regulator having a pneumatic vibrating alert device. The pneumatic vibrating alert device is vibrationally coupled to at least one face-contacting component of the facemask and is acoustically isolated from the surrounding environment.

20 Claims, 8 Drawing Sheets

(56) References Cited

U.S. PATENT DOCUMENTS

| | | | | |
|---|---|---|---|---|
| 4,269,216 | A | 5/1981 | Sullivan et al. | |
| 4,275,723 | A | 6/1981 | Warncke et al. | |
| 4,345,592 | A | 8/1982 | Giorgini et al. | |
| 5,371,427 | A | 12/1994 | Goto et al. | |
| 5,463,368 | A | 10/1995 | Tsunoda et al. | |
| 5,559,761 | A | 9/1996 | Frenkel et al. | |
| 5,602,432 | A | 2/1997 | Mizutani | |
| 5,663,703 | A | 9/1997 | Pearlman et al. | |
| 5,675,456 | A | 10/1997 | Myers | |
| 5,686,882 | A | 11/1997 | Giani | |
| 5,786,106 | A | 7/1998 | Armani | |
| 5,878,354 | A | 3/1999 | Hasegawa | |
| 6,095,142 | A | 8/2000 | Giorgini et al. | |
| 6,242,846 | B1 | 6/2001 | Ashizawa et al. | |
| 6,324,412 | B1 | 11/2001 | Alen et al. | |
| 6,394,091 | B1 | 5/2002 | Giorgini et al. | |
| 6,401,714 | B1 | 6/2002 | Giorgini et al. | |
| 6,850,150 | B1 | 2/2005 | Ronkainen | |
| 6,977,109 | B1 | 12/2005 | Wood | |
| 7,173,881 | B1 | 2/2007 | Freudenberg, Jr. et al. | |
| 7,339,857 | B2 | 3/2008 | Matthey | |
| 2003/0025595 | A1 | 2/2003 | Langberg | |
| 2003/0117272 | A1 | 6/2003 | Fegley et al. | |
| 2005/0110611 | A1 | 5/2005 | Ronkainen | |
| 2005/0183721 | A1* | 8/2005 | Juergensen .............. | G08B 6/00 128/204.26 |
| 2006/0028077 | A1 | 2/2006 | Yamaguchi et al. | |
| 2007/0090710 | A1 | 4/2007 | Chen | |
| 2007/0216537 | A1 | 9/2007 | Park | |
| 2008/0007390 | A1 | 1/2008 | Wells et al. | |
| 2009/0026881 | A1 | 1/2009 | Erturk et al. | |
| 2009/0146527 | A1 | 6/2009 | Lee et al. | |
| 2009/0190964 | A1 | 7/2009 | Lin et al. | |
| 2015/0283409 | A1 | 10/2015 | Huck | |
| 2016/0093190 | A1 | 3/2016 | Kim et al. | |
| 2018/0150137 | A1 | 5/2018 | Gleissner | |
| 2019/0056367 | A1 | 2/2019 | Mou et al. | |
| 2019/0384399 | A1 | 12/2019 | Forest et al. | |
| 2021/0046265 | A1* | 2/2021 | Obenchain ........ | A61M 16/0666 |

FOREIGN PATENT DOCUMENTS

| | | | |
|---|---|---|---|
| CN | 106139438 | | 11/2016 |
| CN | 206953600 | U | 2/2018 |
| CN | 107859641 | A | 3/2018 |
| CN | 209060397 | U | 7/2019 |
| CN | 108227463 | B | 12/2019 |
| DE | 29810098 | U1 | 1/1999 |
| EP | 0016833 | A1 | 10/1980 |
| EP | 0446591 | B1 | 3/1995 |
| EP | 0696068 | A2 | 2/1996 |
| EP | 0625738 | B1 | 12/1997 |
| EP | 0710899 | B1 | 1/1999 |
| EP | 1286563 | A1 | 2/2003 |
| EP | 1674165 | A1 | 6/2006 |
| EP | 0938034 | B1 | 2/2008 |
| EP | 1894259 | A1 | 3/2008 |
| EP | 2136541 | A1 | 12/2009 |
| EP | 2176842 | B1 | 8/2011 |
| EP | 1440429 | B1 | 12/2012 |
| EP | 2587343 | A1 | 5/2013 |
| EP | 2953688 | A2 | 12/2015 |
| EP | 3342489 | A1 | 7/2018 |
| EP | 2198164 | B1 | 11/2018 |
| EP | 3439745 | A1 | 2/2019 |
| EP | 3316077 | B1 | 7/2019 |
| EP | 3077776 | B1 | 8/2023 |
| GB | 0213359 | A | 6/2002 |
| GB | 2386207 | A | 9/2003 |
| JP | 04265671 | B2 | 9/1992 |
| JP | 10045275 | A | 2/1998 |
| JP | 10131857 | A | 5/1998 |
| JP | 4297385 | B1 | 7/2009 |
| KR | 940012904 | A | 6/1994 |
| KR | 20000027956 | A | 5/2000 |
| KR | 20060065140 | A | 6/2006 |
| KR | 20110036142 | A | 4/2011 |
| KR | 20120080044 | A | 7/2012 |
| KR | 20150035634 | A | 4/2015 |
| LV | 14856 | A | 5/2014 |
| MX | 2011013525 | A | 6/2013 |
| WO | 1997046281 | A1 | 12/1997 |
| WO | 2000058923 | A1 | 10/2000 |
| WO | 2001035470 | A1 | 5/2001 |
| WO | 2006136492 | A1 | 12/2006 |
| WO | 2009024687 | A2 | 2/2009 |
| WO | 2013137547 | A1 | 9/2013 |
| WO | 2014123695 | A2 | 8/2014 |
| WO | 2017062709 | A1 | 4/2017 |
| WO | 2017176984 | A1 | 10/2017 |
| WO | 2021019348 | A1 | 2/2021 |

OTHER PUBLICATIONS

"AIR—PAK ® 50 i ™ SCBA", Scott Health & Safety, 2009, pp. 1-8.

"SCOTT® AIR-PAK® and AIR-PAK 75 Models 2.2 / 3.0 / 4.5", SCOTT Health & Safety, 2009, pp. 1-52.

"The Benefits of Dual Redundant Regulators and Vibralert", pp. 1-7.

International Search Report for PCT International Application No. PCT/IB2022/050406, mailed on Apr. 11, 2022, 3 pages.

Satas, "Handbook of Pressure Sensitive Adhesive Technology", 1989, p. 172.

* cited by examiner

FACEMASK WITH VIBRATING ALERT DEVICE

CROSS REFERENCE TO RELATED APPLICATIONS

This application is a national stage filing under 35 U.S.C. 371 of PCT/IB2022/050406, filed 18 Jan. 2022, which claims the benefit of US Provsional Patent Application No. 63/144,800, filed 2 Feb. 2021, the disclosure of which is incorporated by reference in its/their entirety herein.

BACKGROUND

A self-contained breathing apparatus (SCBA) is an apparatus generally used to provide respiratory protection to a person that may be entering an objectionable, oxygen-deficient, and/or otherwise potentially unbreathable or toxic environment. Such apparatuses often include one or more warning devices designed to alert the user when certain operating parameters have changed, such as when only a predetermined amount of air remains available to the user. In such a situation, an alarm will be triggered, thereby alerting the user that they have a limited amount of time to move to an area in which the apparatus is no longer needed and/or to replace one or more depleted air tanks of their apparatus. A number of alert devices have been used with such self-contained breathing apparatus, such as audible alarms (e.g. whistles, buzzers or bells) or lights that flash or provide other visual indicators to the user's face mask, for example.

SUMMARY

In broad summary, herein is disclosed a self-contained breathing apparatus (SCBA) facemask comprising a mask-mounted regulator comprising a pneumatic vibrating alert device. The pneumatic vibrating alert device is vibrationally coupled to at least one face-contacting component of the facemask and is acoustically isolated from the surrounding environment. These and other aspects will be apparent from the detailed description below. In no event, however, should this broad summary be construed to limit the claimable subject matter, whether such subject matter is presented in claims in the application as initially filed or in claims that are amended or otherwise presented in prosecution.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings are not to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as "first" and "second" may be used in this disclosure, it should be understood that those terms are used in their relative sense only unless otherwise noted. As used herein as a modifier to a property or attribute, the term "generally", unless otherwise specifically defined, means that the property or attribute would be readily recognizable by a person of ordinary skill but without requiring a high degree of approximation (e.g., within +/−20% for quantifiable properties). The term "substantially", unless otherwise specifically defined, means to a high degree of approximation (e.g., within +/−10% for quantifiable properties). The term "essentially" means to a very high degree of approximation (e.g., within plus or minus 2% for quantifiable properties); it will be understood that the phrase "at least essentially" subsumes the specific case of an "exact" match. However, even an "exact" match, or any other characterization using terms such as e.g. same, equal, identical, uniform, constant, and the like, will be understood to be within the usual tolerances or measuring error applicable to the particular circumstance rather than requiring absolute precision or a perfect match.

Figure 3:
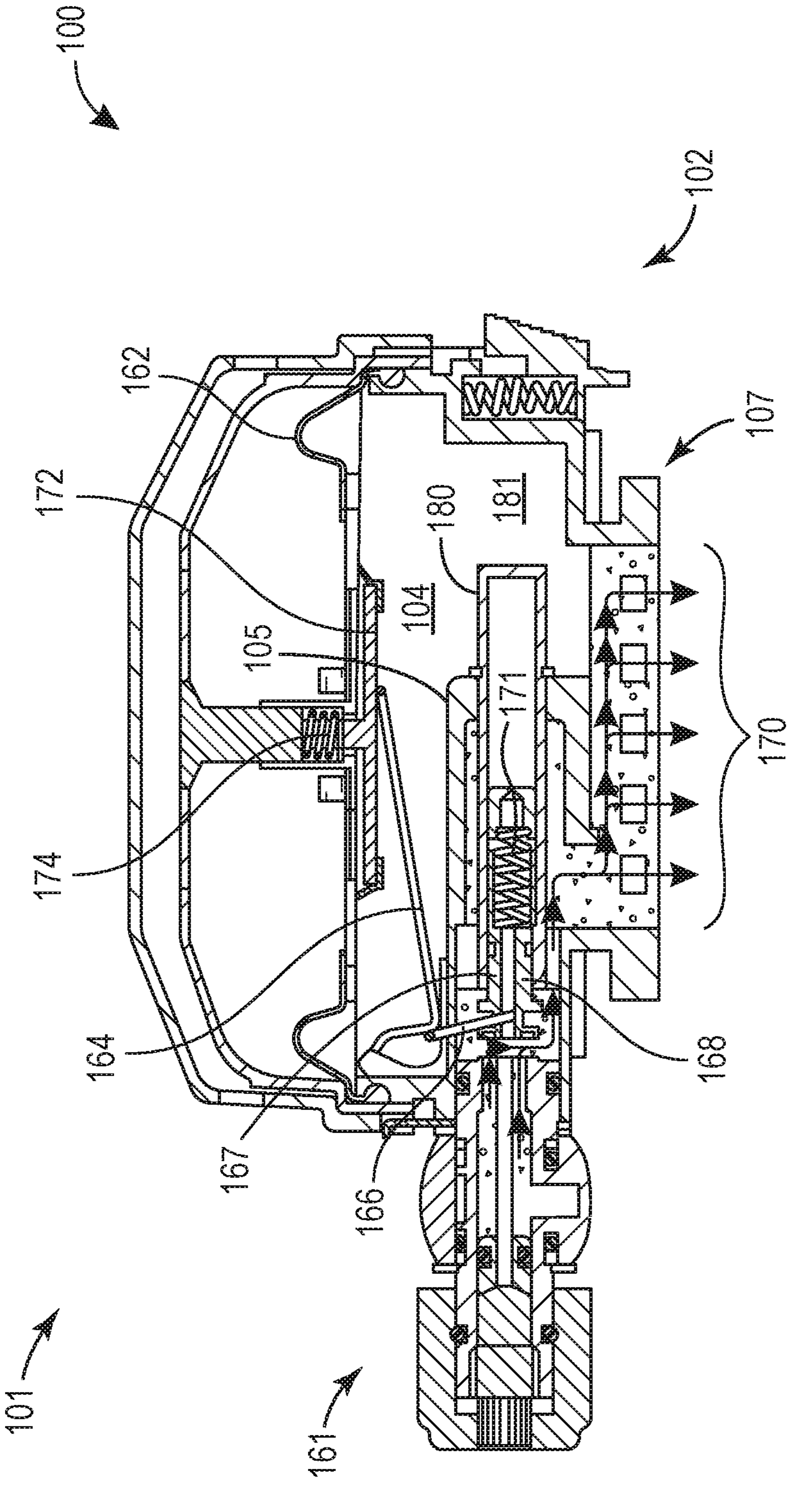
FIG. 3 is a side cross-sectional view of an exemplary mask-mounted regulator of an SCBA system.
Figure 4:
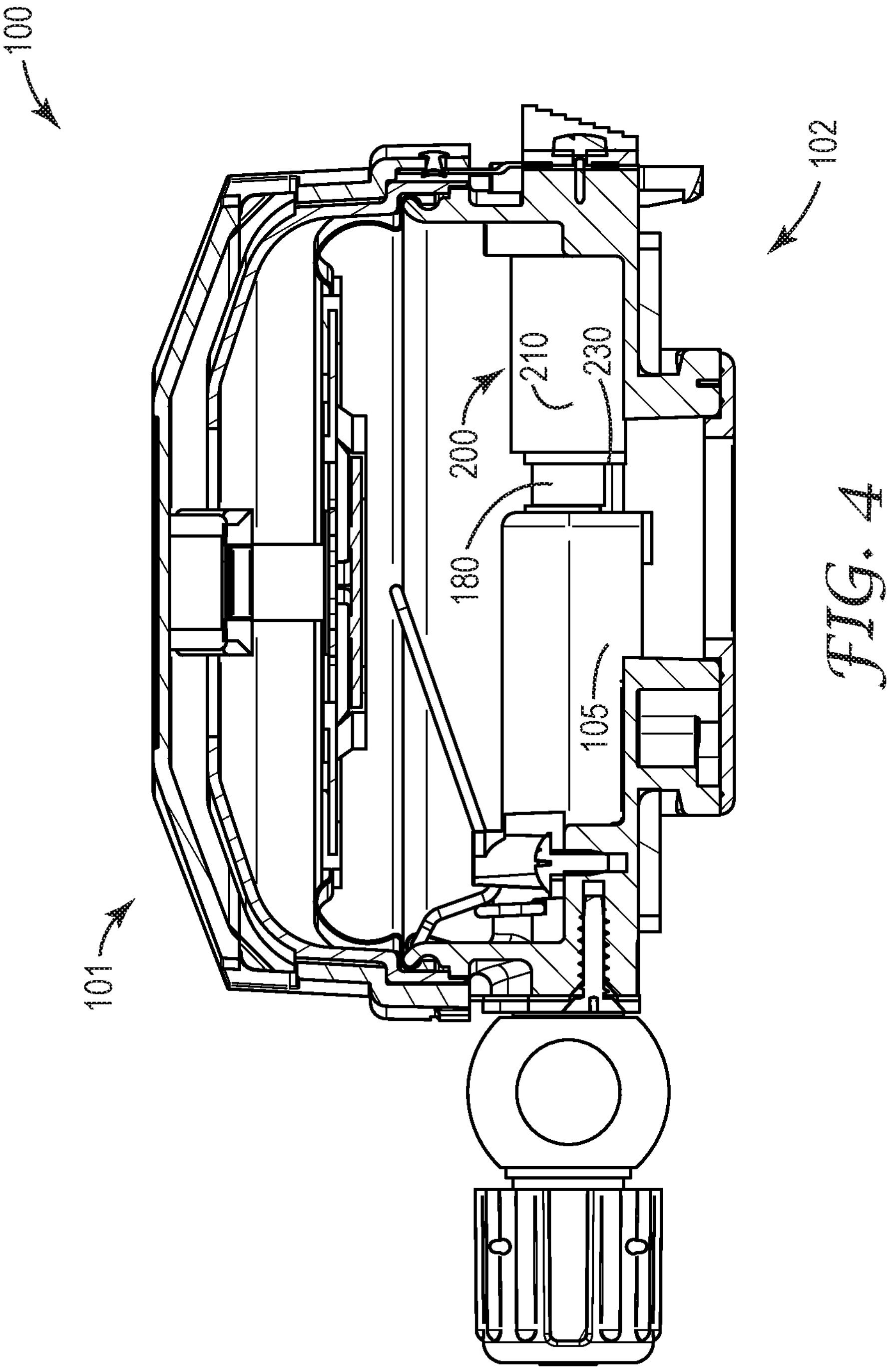
FIG. 4 is a side cross-sectional view of an exemplary mask-mounted regulator of an SCBA system, comprising an exemplary pneumatic vibrating alert device.
Figure 5:
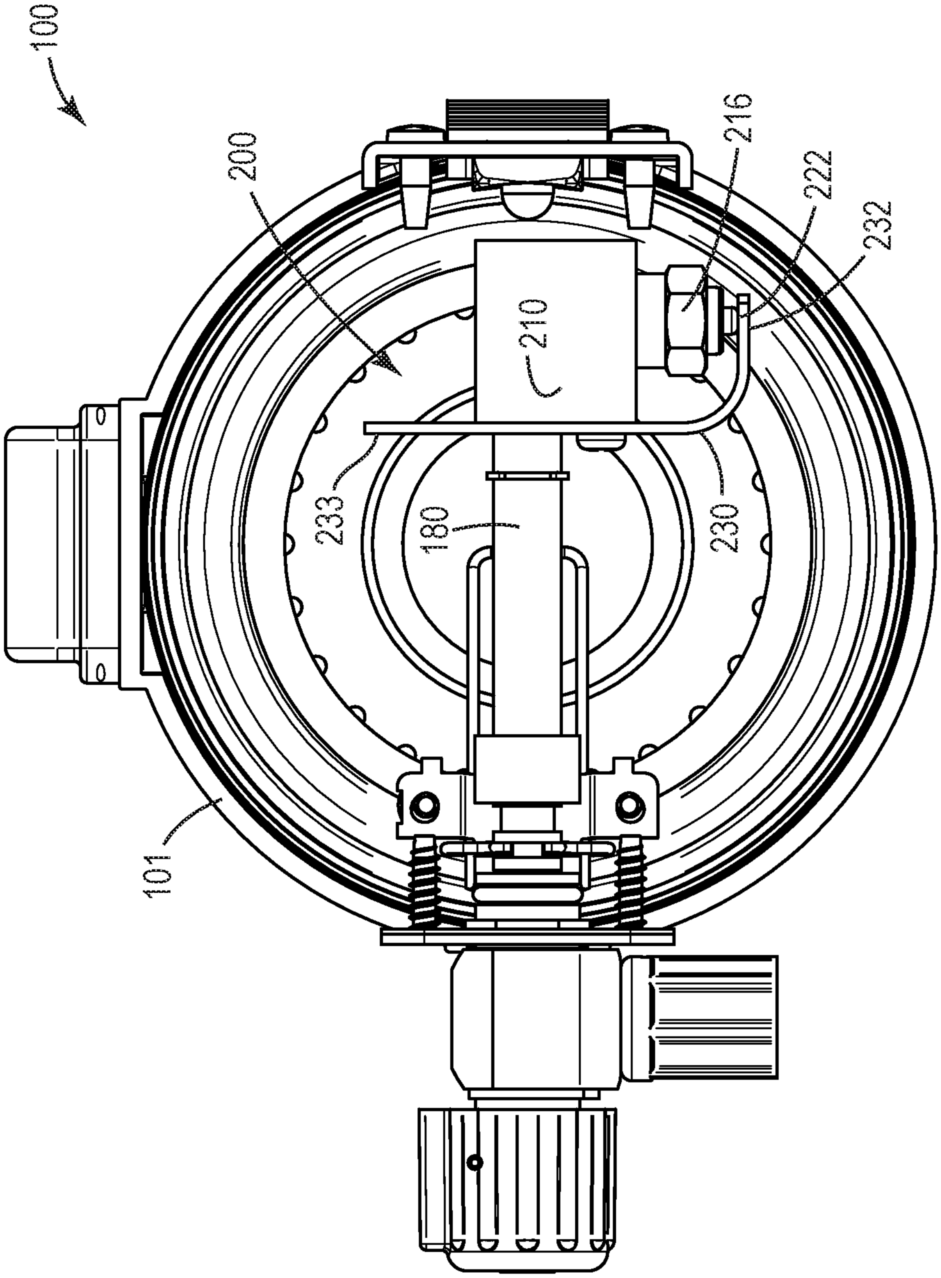
FIG. 5 is rear view of the regulator of FIG. 4, with a rear portion of a housing of the regulator removed.

As used herein, geometric and positional parameters will be used with reference to a facemask, regulator, and components thereof, as positioned on the face of an upright human user. In this context, terms such as forward and front refer to a direction generally away from the user's face, and rear, rearward, and so on, refer to a direction generally toward the user's face. Thus for example, with respect to the exemplary facemask shown in FIG. 2B, forward is to the right on the page as viewed and rearward is to the left on the page as viewed. Similarly, with respect to a regulator that is to be mounted on such a facemask, the front of regulator 100 as depicted in FIGS. 3 and 4 is uppermost on the page as viewed; the rear of regulator 100 is lowermost on the page as viewed. FIG. 5 is a rear view of a regulator, thus forward is into the page as viewed and rearward is out of the page as viewed.

The term "configured to" and like terms is at least as restrictive as the term "adapted to", and requires actual design intention to perform the specified function rather than mere capability of performing such a function. All references herein to numerical values (e.g. dimensions, ratios, and so on), unless otherwise noted, are understood to be calculable as average values derived from an appropriate number of measurements.

DETAILED DESCRIPTION

Figure 1:
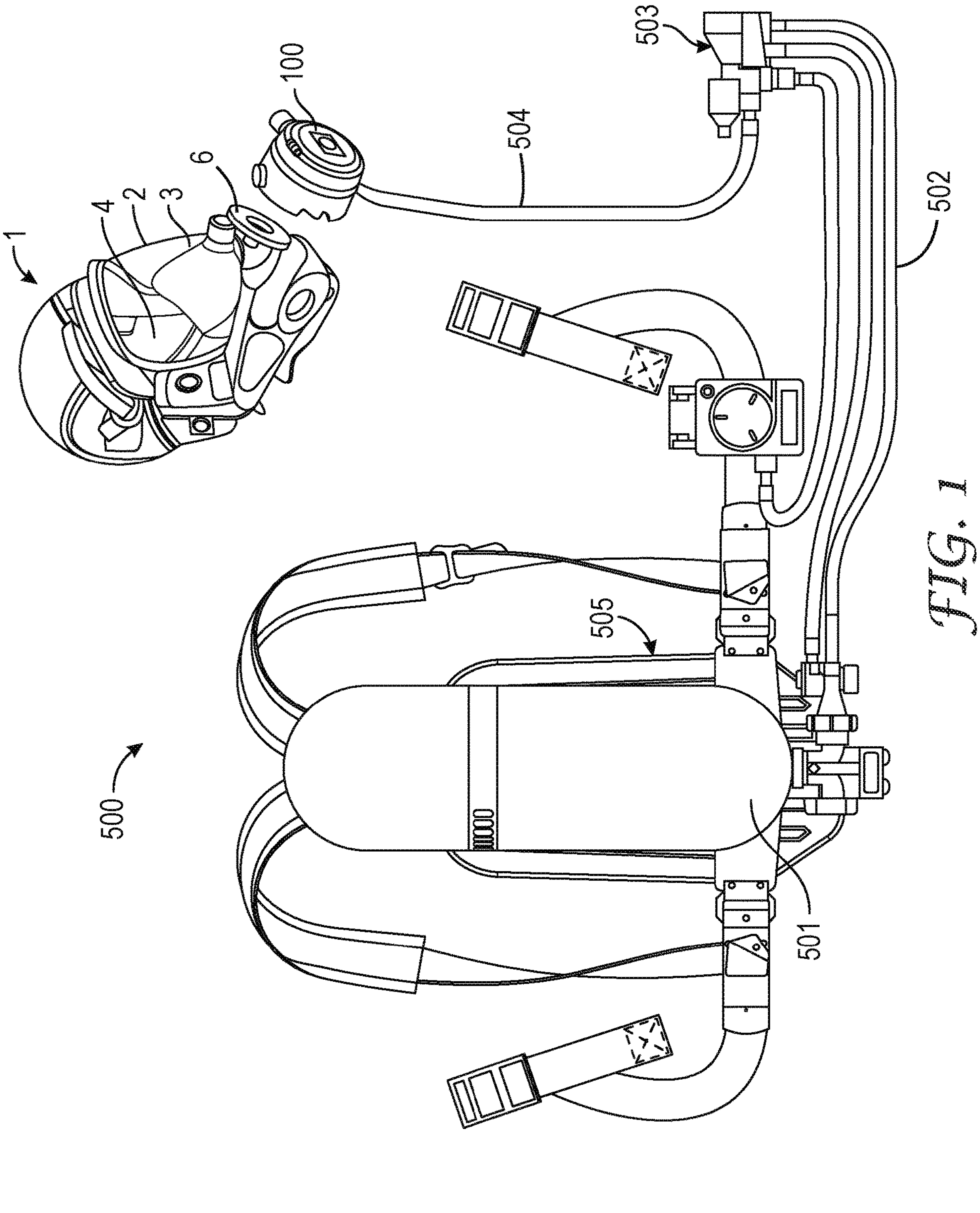
FIG. 1 is a view of an exemplary SCBA comprising an exemplary SCBA facemask.

Shown in FIG. 1 is an exemplary self-contained breathing apparatus (SCBA) 500 arranged to deliver breathable air to a human user of the apparatus. Apparatus 500 comprises one or more tanks (e.g. cylinders) 501 comprising a high-pressure breathable gas or gaseous mixture, most commonly compressed air. The one or more tanks 501 are supported on a harness 505 comprising various straps, plates, buckles, and so on, by which the harness can be donned so that the one or more tanks can be comfortably supported e.g. on the back of the user. SCBA 500 will comprise a facemask 1 and associated tubing and equipment so that breathable air can be supplied to the facemask. In many instances, this equipment may include an in-line first-stage regulator (often referred to as a reducer) 503 that receives the breathable air through tubing 502, and reduces the pressure of the breathable air from the tank pressure (which may be up to e.g. 5000 psi) to an intermediate pressure (e.g. 85-110 psi). The breathable air at this intermediate pressure is then delivered via tubing 504 to a second-stage, mask-mounted regulator 100. Regulator 100 then further reduces the pressure of the air to a suitable value (e.g. to near-atmospheric pressure) and delivers it to the facemask 1.

Figure 2B:
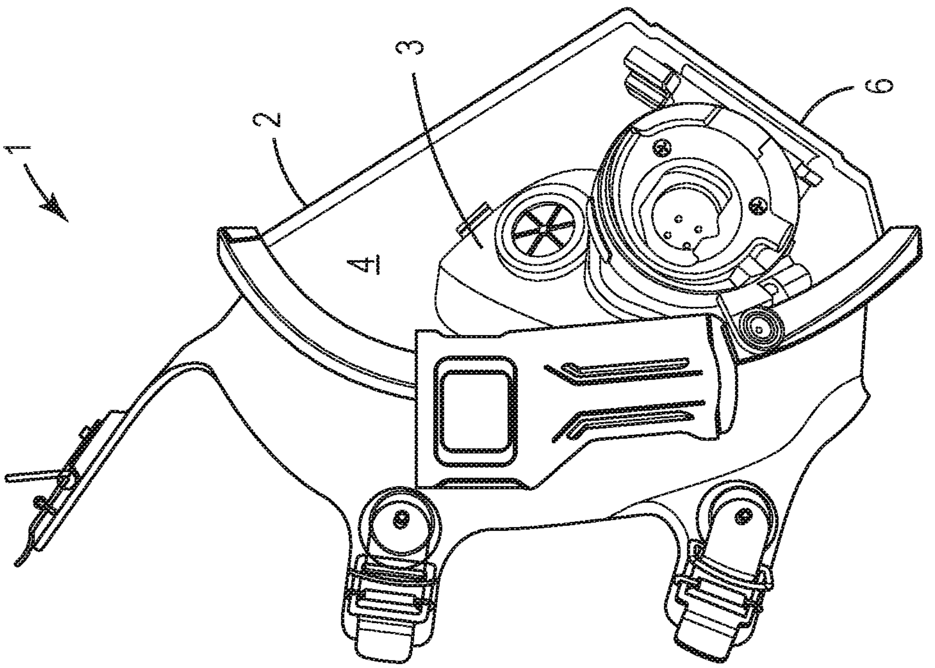
FIGS. 2A and 2B depict other exemplary SCBA facemasks.
Figure 2A:
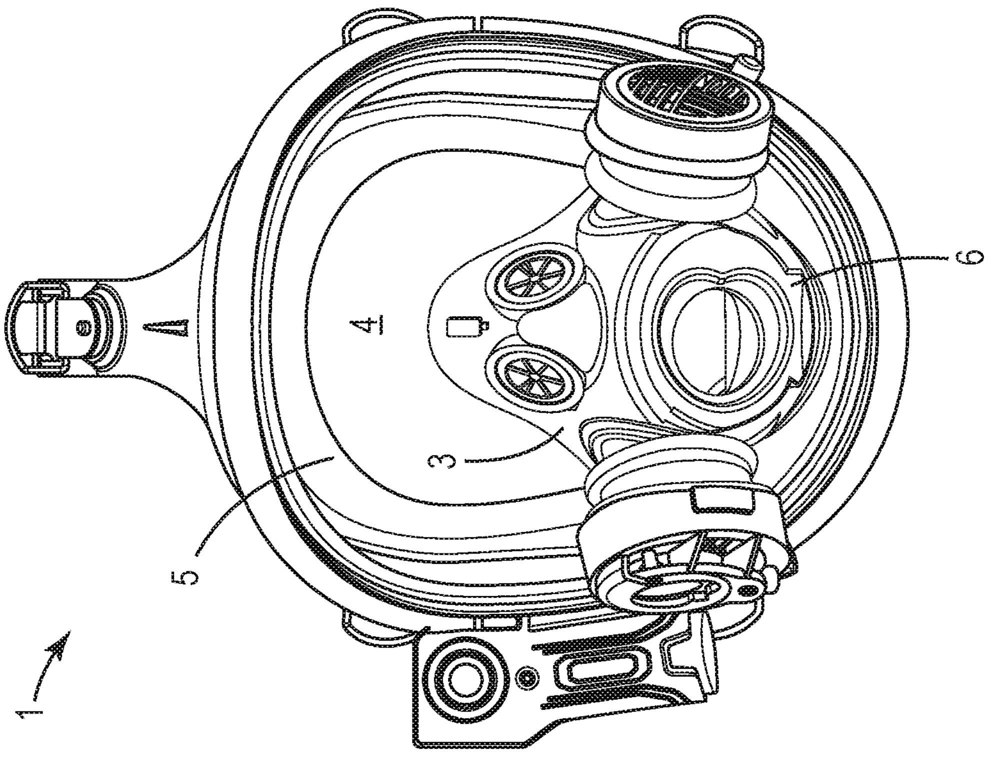

Visible in FIG. 1 is an exemplary facemask 1; another, slightly different style of facemask is shown in front view in FIG. 2A and in side view in FIG. 2B. Any such facemask will typically comprise a head harness (unnumbered in these Figures) to hold the mask in place on the user's face, a generally forward-facing clear pane or lens 2 through which the user can see, and so on. Such a facemask 1 will define an interior volume (air space) 4 when fitted to the face of a human user. Such a face mask will typically comprise a face seal 5 (most easily seen in FIG. 2A), typically made of a compliant material such as e.g. molded silicone or the like, that ensures that the facemask is fitted to the face in a manner that minimizes or eliminates any air leaks. Such facemasks often comprise a nosecup 3 that resides within interior volume 4 and that fits snugly about the nose and mouth of the user to deliver breathable air thereto. The nosecup will often be made of compliant materials in similar manner to the face seal.

A facemask 1 will comprise one or more couplers, connections or fittings 6 that allow regulator 100 to be mounted on, and fluidly connected to, the facemask, so that regulator 100 can deliver breathable air to the facemask. Often, such a coupler 6 may be located toward the lower-front of the facemask, as in FIGS. 1-3. In some instances, such a facemask may comprise various other components, accessories, and so on (for example, the facemask of FIGS. 2A and 2B has side-fittings to which voice amplifiers or radio direct interface devices can be attached, and has a mask-mounted thermal imaging camera (all unnumbered)). These and other ancillary items that may be present on a facemask will not be discussed in detail herein.

An exemplary mask-mounted regulator 100 is depicted in side cross-sectional view in FIG. 3. Such a regulator will reduce the pressure of the breathing air (which, as noted above, may enter the regulator at a pressure of e.g. 85-110 psi) to a level suitable for breathing. In many embodiments, such a regulator may be an "on-demand" regulator that provides airflow in response to inhalations of the user. Typically, such a regulator may include a housing within which a diaphragm is disposed, the diaphragm being coupled to an actuating mechanism which opens and closes an inlet valve. The user's respiration creates a pressure differential that causes displacement of the diaphragm thereby controlling (e.g., opening and closing) the inlet valve.

In further detail, exemplary regulator 100 as depicted in FIG. 3 may comprise a housing comprising a front housing portion 101 and a rear housing portion 102, which collectively define an interior volume 104 therebetween. Regulator 100 comprises a coupler 107 that can be connected to a complementary coupler 6 of facemask 1 so that regulator 100 can be mounted on facemask 1. Often, such complementary couplers may be mated to each other and then twisted (e.g. through 90 degrees or 180 degrees, or some value therebetween) to secure the couplers together. Air is supplied (from tube 504) to regulator 100 via one or more entry ports 161; one or more exit ports 170 are provided so that the air, its pressure having been reduced to a suitable level, can exit the regulator and enter the facemask.

Such a regulator may rely on a demand valve comprising, among other items, a demand piston 168 (this and other components are visible in FIG. 3 and are also shown in further detail in FIG. 7, which is discussed in additional detail later herein). Demand piston 168 resides in, and is slidably movable back and forth within, a portion of an air chamber 167 within a tube 180. In the absence of inhaling by the user, a biasing spring 171 urges the demand piston in a direction (to the left, in FIG. 3) so that a face 169 at a first end of the demand piston is seated in contact with a receiving surface to make a seal so that no air pathway is present. Upon inhalation by the user, a diaphragm 162 presses inward on a demand valve lever 164 causing a piston lever 166 to pivot, thus overcoming the force of the biasing spring 171 and moving demand piston 168 to the right. This separates the face 169 of piston 168 from the receiving surface thus opening an air pathway that allows breathing air to flow into and through the regulator and into the facemask. Such an arrangement (with flow of breathing air indicated by arrows) is evident in FIG. 3.

When the user exhales (or stops inhaling), the above-described force on the demand valve lever diminishes so that the biasing spring 171 urges the demand piston back to its seated position thus closing the inhalation air pathway. User exhalation also causes diaphragm 162 to move forward (upward, in the view of FIG. 3) toward the front housing piece 101 of the regulator housing. A post (unnumbered) at or near the radial center of diaphragm 162 comes in contact with the front housing piece, causing an exhalation valve 172 at or near the radial center of diaphragm 162 to cease moving while the radially outer portion of diaphragm 162 continues to travel forward. This forces the radially central portion of diaphragm 162 to open, creating a path for the air exhaled by the user to exit the regulator into the ambient environment. As the exhalation ends, the diaphragm 162 relaxes and spring 174 closes the exhalation valve 172 and positions the diaphragm 162 for the next inhalation.

It will be apparent that the above is merely one exemplary arrangement and that a mask-mounted regulator may comprise a variety of configurations. In many embodiments, such a regulator may be a positive-pressure, on-demand regulator in which breathing air is delivered to the mask during a user inhalation with the air delivery ceasing upon exhalation, but in which the regulator maintains the breathing air at a pressure that is slightly above the ambient pressure at all times. Various regulators of this and other types are described in detail e.g. in U.S. Pat. Nos. 4,345,592, 4,269,216, 6,095,142, and 6,394,091.

As disclosed herein, mask-mounted regulator 100 comprises a pneumatic vibrating alert device 200. As evident from comparison of FIGS. 3 and 4, such a device 200 can be fitted into a space 181 within interior volume 104 of regulator 100, that would otherwise be empty (or occupied by some other item). A terminal end of the above-described tube 180, which would simply be a dead-end (as in FIG. 3) in the absence of device 200, can instead have an opening 194 (as seen in FIG. 7) so that air can be delivered to device 200 via tube 180. Tube 180 will thus be referred to herein as a delivery tube. (In some embodiments, tube 180 may be at least partially covered by a housing 105, visible in FIGS. 4 and 8 but omitted in FIG. 5.)

Figure 6:
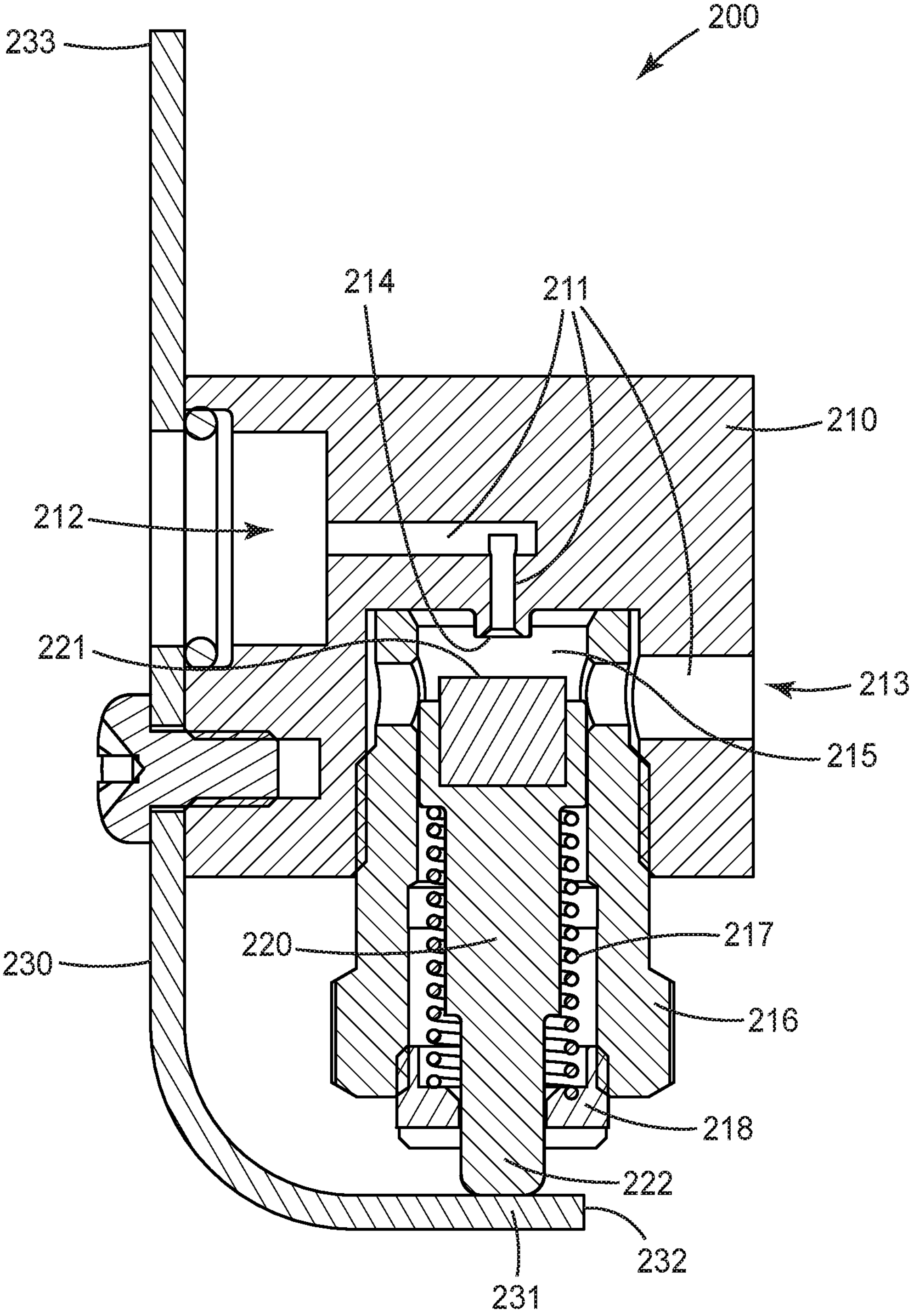
FIG. 6 is a cross-sectional view of an exemplary pneumatic vibrating alert device.

With reference to FIG. 6, in some embodiments a pneumatic vibrating alert device 200 may comprise a manifold body 210 with an interior through-air pathway 211 provided therein. In many convenient embodiments, manifold body 210 may comprise a piece of metal, e.g. aluminum, with various passages provided therein, e.g. by drilling, machining, or the like, to form air pathway 211. Body 210 comprises a chamber 215 that is fluidly connected to air pathway 211; disposed partially within chamber 215 is a plunger 220. Upon entry of air under sufficient pressure into air pathway 211, plunger 220 is caused to move back and forth in a reciprocating manner so that an exposed terminal end 222 of plunger 220 periodically and repeatedly impacts a striker plate 230 as described in detail below. Striker plate 230 is thus caused to vibrate in a manner which can alert a user of, e.g., a condition of the air supply of the SCBA as discussed later herein. Device 200 is activated (to generate a vibrational alert), or is not activated, strictly as a function of the properties (e.g. pressure) of the air that enters device 200. Thus by definition, device 200 is a pneumatic device that does not require any electrical power to function.

Further details of the components and functioning of device 200 are discussed with reference to FIG. 6, which illustrates the various components of device 200 in isolated cross-section. Manifold body 210 comprises an air-entry port 212 that is configured to receive a terminal end of the above-discussed delivery tube 180. Air thus leaves tube 180 through opening 194 and enters airflow pathway 211 of body 210 through entry port 212. An O-ring (visible in FIG. 6, but not numbered) can be provided to ensure a leak-free fit. (Various other O-rings, seals, gaskets, packings, and so forth, may be used to provide optimum leakproof operation of regulator 100 and of alert device 200 and may be visible in certain figures herein.)

The incoming air follows an passage of air pathway 211 into body 210 and enters an upper portion of a chamber 215 through an orifice 214. A portion of chamber 215 may be defined by space machined into body 210, with another portion (e.g. a lower portion) being defined by a sleeve 216 (most easily seen in FIG. 5) that is installed into a receiving space of body 210. In some embodiments, such a sleeve 216 may be a separately-made item that is attached to body 210 (e.g. by screwing sleeve 216 into place). The above-noted plunger 220 is mounted within chamber 215 so that plunger 220 can slidably move back and forth (up and down, in the view of FIG. 6) within chamber 215, with plunger 220 being biased toward the above-mentioned orifice 214 by a biasing spring 217. An opposite end of spring 217 is seated against an adjustable collar 218 that can be adjusted (e.g. screwed inward or outward relative to manifold body 210, then locked into place e.g. by a threadlocker) so as achieve the desired compression on biasing spring 217.

When the pressure of the air in entry port 212 is below a predetermined threshold, device 200 will remain in an inactive state. That is, a pressure below this threshold is insufficient to overcome the biasing force of spring 217 thus a face at a first end 221 of plunger 220 remains firmly seated (abutted) against orifice 214 thus sealing air pathway 211 so that no airflow through pathway 211 occurs. If the pressure increases above this threshold, the biasing force of the spring will be overcome and plunger 220 will move (e.g. to the position shown in FIG. 6) so that a second terminal end 222 of plunger 220 impacts striker plate 230 at a target location 231 as seen in FIG. 6. Meanwhile, the movement of plunger 220 toward the striker plate will open an exit-air pathway from chamber 215 to exit port 213.

It will be appreciated that such an arrangement can cause plunger 220 to move from a first position to a second position, thus impacting striker plate 230. However, in order that device 200 provide a vibrating alert that continues e.g. indefinitely, plunger 220 must reciprocate back and forth between these two positions rather than simply moving one time. One way of achieving this is by configuring the above-mentioned delivery tube 180 by which air is supplied to inlet 212 of device 200. Thus, with reference to FIG. 7, which is an isolated cross-sectional view of tube 180 (and demand piston 168, etc.), a flow-restriction, e.g. in the form of a small metering orifice 191, may be provided in tube 180, downstream (along the airflow path to reach device 200) of piston 168. Such a metering orifice 191 can be provided e.g. in a disc or plug 190 that is mounted within tube 180 with a downstream end of the plug 190 supported in place by a shoulder provided in tube 180; the upstream end of plug 190 may in turn comprise a shoulder that supports the downstream end of biasing spring 171. A air-holding chamber 192 is provided downstream of metering orifice 191; an air-feed chamber 193 is provided upstream of metering orifice 191 (chamber 193 may be a downstream portion of the above-described chamber 167).

Such an arrangement can provide that the rate at which air can pass through metering orifice 191 to enter holding chamber 192 is limited by the geometric dimensions of orifice 191. So, as the air pressure increases above a predetermined level as discussed above, plunger 220 will move and impact the striker plate 230. In moving, plunger 220 will open an exit-air pathway (to exit port 213) from device 200 as noted above, which will exhaust the excess air from the air pathway 211 of body 210 and will also exhaust the excess air that has built up in holding chamber 192 of delivery tube 180. That is, the pressure in these locations may drop back e.g. to near-atmospheric. Chamber 167, in contrast, will contain air at a higher pressure. However, metering orifice 191 prevents this air from entering holding chamber 192 quickly. Thus, the response time of refilling holding chamber 192 with air after a drop in the air pressure in holding chamber 192 is slow compared to the response time for spring 171 to urge plunger 220 back to its original position in which it was seated against orifice 214. Thus, upon an increase in air pressure to a high level, plunger 220 will be urged downward so that it impacts striker plate 230; however, this opens the exhaust air pathway causing the pressure to decrease to the point that spring 171 urges plunger 220 back to its original position, all before chamber 192 can be refilled with air so as to regain the original, high pressure. Upon chamber 192 eventually refilling so as to reach this high pressure level, the cycle will repeat. The desired reciprocating action is thus obtained.

The various parameters of device 200 and of the components of regulator 100 that it acts in cooperation with (e.g. the volume of holding chamber 192, the diameter of metering orifice 191, the diameter and length of the various passages along air pathway 211, the force exerted by spring 171, and so on), can all be set in cooperation so that the desired reciprocation is activated at a predetermined pressure (and so that the reciprocation occurs at a desired frequency, e.g. 10-50 Hz).

Figure 7:
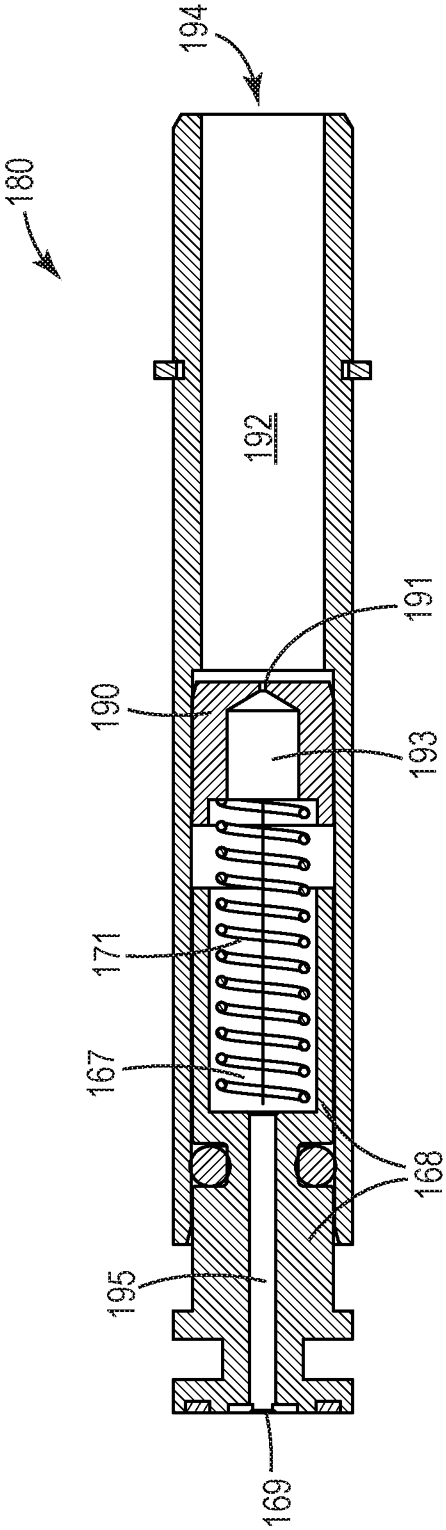
FIG. 7 is a cross-sectional view of an exemplary delivery tube and demand piston of a mask-mounted regulator, that may be used in concert with a pneumatic vibrating alert device.

As shown in FIG. 7, piston 168 may comprise an air passage 195 that extends completely along the length of piston 168, from one end to the other. Such a feature allows air to pass through piston 168 to reach orifice 191 even if piston 168 is positioned so that face 169 of piston 168 seals the breathing air path (that is, during an exhalation portion of the breathing cycle). This arrangement allows air to reach alert device 200 continuously, independent of the starting and stopping of the delivery of breathing air as controlled by the position of piston 168 (noting that the breathing air is delivered (to exits 170) via a route that does not pass through the piston, as is evident from the arrows indicating breathing-air flow in FIG. 3). This ensures that pneumatic vibrating alert device 200 will function (i.e., will keep emitting an alert signal) regardless of whether the user is inhaling or exhaling. This is advantageous over arrangements that only emit an alert signal during an inhalation portion of the user's breathing cycle. It is noted in passing that upon activation of alert device 200, a portion of the air that is delivered from the air tank(s) to regulator 100 will be diverted into device 200 rather than being delivered into the user's mask for breathing. Thus, strictly speaking, this portion of the air that is delivered from the air tank(s) to regulator 100 may not necessarily be breathed in by the user. However, for convenience, all of the air that is delivered from the air tank(s) to regulator 100 will be referred to herein as "breathing air".

The above discussions reveal that pneumatic vibrating alert device 200 will be activated to issue an alert signal (e.g. a vibration) when the pressure exceeds a predetermined threshold. However, in most SCBA scenarios, it is desired to issue an alert when the air tank pressure drops below a particular threshold; that is, as a signal that the air tank has dropped below, for example, 25% of its capacity. While this seems paradoxical, in fact an alert device 200 as disclosed herein is particularly suited for use in operation with SCBAs that have dual-redundant functioning. Such dual-redundant SCBA systems are well-known and are described, for example, in U.S. Pat. No. 6,401,714, as well as in U.S. Provisional Patent Application 62/879,279 and in the resulting published as International Patent Application Publication WO 2021/019348, all of which are incorporated by reference herein in their entirety. In brief, such dual-redundant systems often use a first-stage regulator (sometimes referred to as a reducer, as noted earlier herein) that has a first, primary air pathway that is configured to deliver breathing air to the second-stage (mask-mounted) regulator at a pressure range of e.g. 85-110 psi. The first-stage regulator has a secondary, parallel air pathway that is configured to deliver the air to the mask-mounted regulator at a pressure range of e.g. 145-170 psi. (Me mask-mounted regulator is capable of reducing even this higher pressure down to a near-atmospheric pressure suitable for breathing by a user.) The first-stage regulator is configured (e.g. with an low-tank-pressure transfer valve and various associated items) so that if the air tank pressure falls below a predetermined threshold, the first-stage regulator will automatically switch from the primary air pathway to the secondary air pathway. (Similar effects can be achieved by using two first-stage regulators arranged in parallel and configured to deliver air at different pressures, as described in U.S. Pat. No. 3,957,044).

This being the case, a pneumatic vibrating alert device as described herein is well suited to be activated by this higher pressure to provide an alert signal that the first-stage regulator has apparently switched from the primary to the secondary air pathway and thus to apprise the user that the pressure in the air tank has apparently dropped below a particular level (e.g., the air tank is down to 25% capacity). It is noted that an above-described first-stage regulator with first and second parallel air pathways can be arranged with an automatic transfer valve so that the secondary air pathway takes over in the event of a problem with the primary air pathway (regardless of whether the tank pressure has fallen below any particular level), so the alert device can inform the user of a possible problem with the first-stage regulator.

The above discussions make it clear that an alert device can be very useful, e.g. to notify a user of an SCBA that the air supply has fallen to a particular level. Indeed, alert devices of the general type described above have been available for a considerable time, e.g. in SCBAs such as the AIR-PAK 50i available from 3M/Scott Safety, Monroe, NC. However, such alert devices as conventionally used rely on the emission of a loud audible noise (e.g. of 80 dB or more), in some instances accompanied by a tactile vibration. The present investigations have revealed that in some situations it may be advantageous to provide an alert device that functions substantially, e.g. solely, by way of tactile vibration. Such an arrangement may be useful e.g. for an SCBA that is intended for use in situations when the maintaining of silent or near-silent conditions is imperative. Such situations may include, for example, covert or stealth operations in locations or environments in which there is a possibility of the ambient atmosphere being, or becoming, compromised e.g. through release of tear gas or other irritants or toxic agents.

Acoustical Isolation

In such cases, the arrangements disclosed herein can be used, in which an in-mask regulator 100 and its resident alert device 200 are configured to acoustically isolate the alert device from the surrounding environment (e.g. from the ambient air in which the SCBA is present). In some embodiments, these items may be further configured to preferentially promote the transmission of solid-borne vibration to at least one face-contacting component of facemask 1 of the SCBA. At the very least, the alert device 200 will be vibrationally coupled to at least one face-contacting component of the facemask of the SCBA. By this is meant that at least one pathway is present along which solid-borne vibrations emitted by the alert device (e.g., vibrations emitted by a striker plate of the device) can travel into the facemask to reach a face-contacting component of the facemask so that the vibration can be sensed by the user of the SCBA. While such a pathway may, in some instances, include one or more interfaces in which one component of the regulator or facemask is abutted against another component of the regulator or facemask, such a pathway will not require the solid-borne vibration to cross an airgap between such components. In some convenient embodiments, a face-contacting component to which the solid-borne vibration is transmitted may be an item that is already present in the facemask for some other purpose, e.g. a nosecup 3 of the facemask. In some embodiments, such a face-contacting component may be a face seal 5 of the facemask. In other embodiments, such a face-contacting component may be a designated item that is provided specifically for the purpose of vibration alerting and that serves no other purpose.

To achieve acoustical isolation as described herein, a facemask, regulator and alert system thereof need only minimize the sound that is emitted by the alert device to the point that the sound level is below a specified threshold at a specified distance from the alert device. By definition, an acoustically isolated alert device as disclosed herein, when activated to emit a solid-borne vibration signal, will exhibit a sound pressure level (A-weighted) of less than 50 dB at a distance of 10 feet. Such a measurement will be performed under conditions simulating actual use; that is, with the alert device installed within the mask-mounted regulator and with the facemask mounted on a user's face (or a fixture to simulate such a face), and with all of the various fittings and couplings in place. In other words, the testing will not be performed on the alert device in isolation (since, as will be evident from the discussions below, in some instances the regulator may play an important role in minimizing the airborne sound that is emitted into the surrounding environment). In various embodiments, an acoustically isolated alert device may exhibit an A-weighted sound pressure level of less than 40, 30 or 20 dB at a distance of 10 feet.

Figure 8:
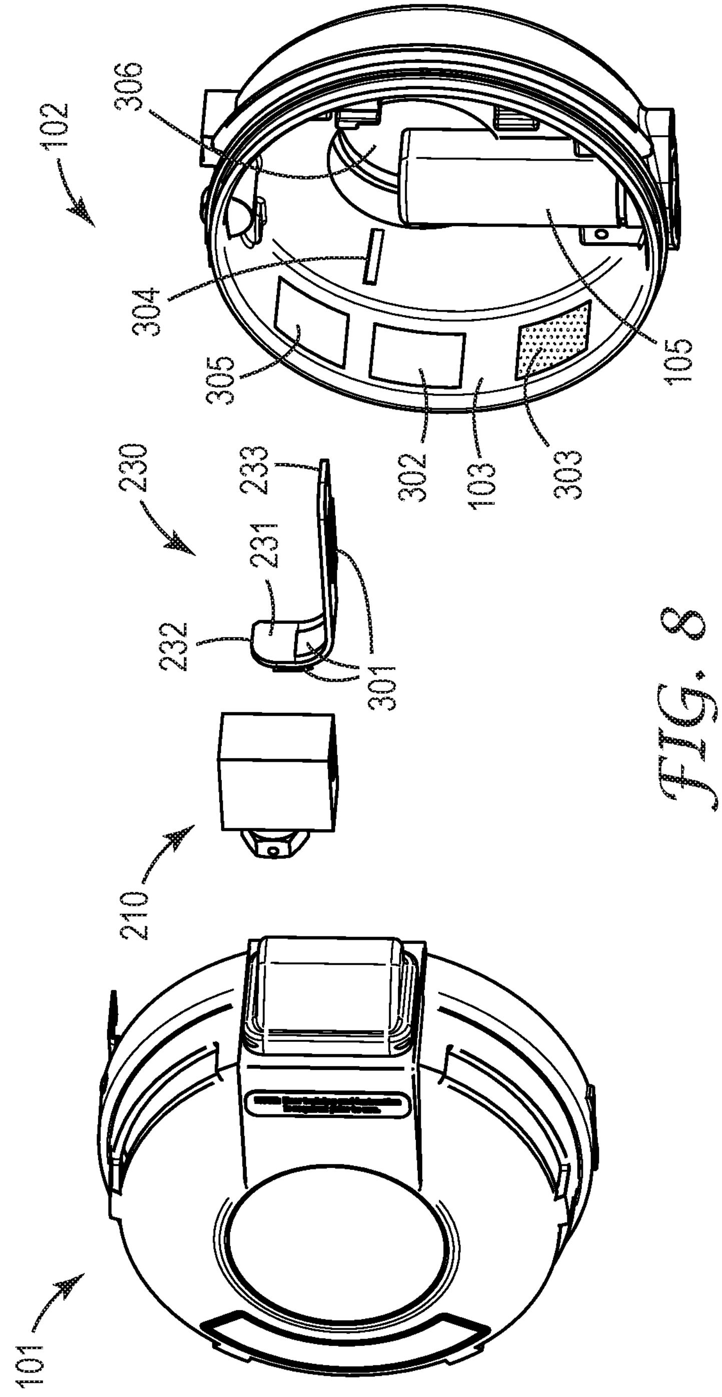
FIG. 8 is an exploded view of front and rear housing portions of an exemplary mask-mounted regulator, and of portions of an exemplary pneumatic vibrating alert device.

An alert device 200 as disclosed herein will emit a signal (e.g., airborne and/or solid-borne) by virtue of a plunger 220 impacting a striker plate 230 in the manner described earlier herein. In general, the minimization of airborne noise created by such an interaction may be achieved in various ways or by a combination of such ways. Such approaches may include e.g. reducing the coupling of the striker plate to the air within the regulator (e.g. by providing a large impedance mismatch between the striker plate and the air within the regulator), reducing any tendency of the striker plate to resonate in a way that emits large amounts of airborne vibrations, and so on. Various such approaches are illustrated in FIG. 8, which depicts a striker plate 230 (and a manifold body 210) of a pneumatic vibrating alert device along with a front housing portion 101 and a rear housing portion 102 of a regulator, with other components of the alert device and the regulator being omitted for ease of visualizing the remaining components. FIG. 8 is an exemplary, generic depiction that is provided for the purpose of illustrating the range of approaches and items that can be used, either alone or in combination, to achieve the desired acoustic isolation. It is emphasized that it is not required that the particular combination of approaches and items shown in FIG. 8 must be used.

In some embodiments, any or all such objectives may be achieved by providing that at least a portion of a major surface of striker plate 230 is in contact with at least one layer 301 of damping material. Various layers of damping material 301 are illustrated in exemplary representation in FIG. 8. A damping material is any material that is sufficiently viscoelastic (e.g. in terms of a high loss modulus) to significantly reduce the airborne sound emitted by striker plate 230 when impacted by plunger 220. As defined herein, a damping material is a material that exhibits a Shore A hardness of less than 70. In various embodiments, a damping material may exhibit a Shore A hardness of less than 60, 50, 40, 30, 30, 20, or 10. In further embodiments, a damping material may exhibit a Shore 00 hardness of less than 70, 60, 50, 40, 30, or 20. (In regimes in which these ranges overlap, the Shore 00 scale will be used; all such measurements will be at 22 degrees C.) In some embodiments, such a damping material may comprise, or be, an organic polymeric material, e.g. made of silicone, polyurethane (e.g. SORBOTHANE), and so on. It will be appreciated that viscoelasticity can be affected not only by the composition of an organic polymeric material, but also by the number and nature of crosslinks that are present in the material, the presence of any fillers or additives in the material, and so on. Thus in some embodiments a damping layer might take the form of an organic polymeric matrix comprising parcels of shear-thickening material.

Any such damping layer can be attached e.g. to a major surface of striker plate 230 in any suitable way. In some embodiments, this can be performed by the use of a pressure-sensitive adhesive (PSA). By a PSA is meant a material that satisfies the Dahlquist criterion, which defines a pressure sensitive adhesive as an adhesive having a 1 second creep compliance of greater than $1\times10^{-6}$ $cm^2$/dyne (at 22 degrees C.) as described in "Handbook of Pressure Sensitive Adhesive Technology", Donatas Satas (Ed.), 2nd Edition, p. 172, Van Nostrand Reinhold, New York, NY, 1989, incorporated herein by reference. In some embodiments such a PSA may provide some or most of the damping that is achieved. That is, PSAs often exhibit a high loss modulus and thus may be ideal for such purposes. In some embodiments a damping "layer" may be a multilayer structure in the form of a so-called constrained-layer damper (sometimes referred to as a damped structural composite) that comprises at least one PSA layer along with at least one constraining layer made of a relatively stiff material (e.g. plastic or metal).

The use of a layer 301 of damping material (and any other approach disclosed herein) is predicated on the approach not unacceptably reducing the generation and transmission of solid-borne vibration from striker plate 230. So, in addition to selecting a damping layer to have particular viscoelastic properties, the location of a damping layer 301 on striker plate 230, and/or the size of the damping layer, can be chosen to minimize airborne sound emission without unduly reducing solid-borne vibration. FIG. 8 illustrates various possible locations for one or more damping layers 301. For example, an end portion 233 of striker plate 230, which end portion 233 is relatively far away from target area 231 at which plunger 220 impacts striker plate 230, may have a damping layer 301 disposed thereon. This may be particularly useful if such a portion of the striker plate is unconstrained over a considerable extent of its length (e.g. if the plate is cantilevered so as to have an unconstrained end) such that this portion would be likely to emit considerable airborne sound. As illustrated, a damping layer could be put on either major surface of the striker plate (e.g. the major surface that is impacted by the plunger, or the opposite major surface), at any location along the length and/or breadth of the striker plate. In some embodiments, a damping layer may be present on at least 50, 70, 90, or 95% of the area of one major surface, or of both major surfaces, of striker plate 230. In some embodiments damping layers may be present on both major surfaces with the damping layers e.g. forming a sheath that sandwiches a significant portion of the striker plate. In some embodiments such a sheath may take the form of separate layers that are disposed separately on each major surface of the striker plate; in other embodiments such a sheath may take the form of a sleeve (e.g. a sock or boot) that is e.g. slidably mounted onto the striker plate so as to generally, substantially or essentially completely encapsulate the striker plate.

In pursuit of the above objects, the geometric design (size and shape) of striker plate 230, and/or the extent to which it has an unsupported end and/or the number and location of positions in which it contacts (e.g. is attached to) manifold body 210 or to any component of regulator 100, can be chosen to advantage. Thus for example, the size of any unsupported portion (e.g. a cantilevered end portion) of the striker plate in a location far from the target area 231 at which the plunger impacts the striker plate, may be minimized. Also, contact of striker plate 230 with any component of regulator 100 may be minimized in any location that would tend to promote vibration of regulator 100 which would cause airborne sound to be emitted outward into the ambient environment (e.g., locations toward the front housing of the regulator). Conversely, contact of striker plate 230 with any component of regulator 100 that can enhance the transmission of solid-borne vibration toward facemask 1 (e.g. locations toward the rear housing portion 102 of the regulator) may be retained or maximized. In more general terms, the size and shape of striker plate 230, and/or the locations at which the striker plate is in contact with a component of the regulator, may be chosen so as to purposefully modify the moment arm that results from the plunger impacting the striker plate.

Furthermore, at any location at which it is desired to minimize transmission of solid-borne vibrations into a component of the regulator (e.g. because such a component may tend to emit this vibration into the ambient environment), a damping layer may be used to provide vibration isolation between the striker plate and the regulator component. (In other locations, it may be desirable to maintain intimate contact between such items to promote the transmission of solid-borne vibration into the facemask.) Thus in some embodiments a layer of damping material may be interposed between the striker plate and a component (e.g. a housing) of the regulator, in a chosen location at which the striker plate closely abuts the regulator component. By closely abuts is meant within 0.5 mm of; in particular, this encompasses situations in which the striker plate would be in direct contact with the regulator component in the absence of the vibration-isolating damping layer. For such purposes, any damping layer may be used (e.g. chosen from those described above), so that the damping layer can serve e.g. as a vibration-isolation spacer or gasket.

In addition to, or in place of, the above-discussed approaches to minimizing airborne sound that is emitted by the striker plate of the alert device, the regulator in which the alert device is installed can be configured to minimize the amount of airborne noise that is emitted by, or escapes from, the regulator into the ambient environment. This includes for example airborne noise that escapes from the interior of the regulator through openings, gaps, leaks, in the housing, as well as airborne noise that results from the housing of the regulator itself vibrating so as to emit airborne noise. It will be recognized that some approaches may serve to mitigate both types of pathways.

In some embodiments, regulator 100 (in particular front and/or rear housing portions 101 and 102 thereof) may be configured to have minimum openings or passages therethrough, and/or may be configured (e.g. with one or more gaskets) so that the housing portions seal together with minimum air leaks. (All such arrangements must not interfere with the proper functioning of the regulator.) Such an approach may primarily affect the first of the above-mentioned pathways (the escape of airborne noise from the interior of the regulator). One approach that may be used to primarily affect the second pathway is to provide that at least a portion of the regulator housing (e.g. the front housing portion 101) exhibits enhanced sound-barrier properties. For example, the housing might be made of a so-called mass-loaded polymeric material. A mass-loaded polymeric material is defined herein as an organic polymeric material that is loaded with a filler (e.g. a mineral or metal filler such as barium sulfate) so that the resulting composite material exhibits an overall density of at least 2.0 g/cc. In various embodiments such a mass-loaded material may exhibit a density of at least 3.0 or 4.0 g/cc. Rather than the housing portion itself being made of such a material, in some embodiments a mass-loaded material may be obtained as a layer (e.g. a sheet) 305 that is attached (e.g. by way of a pressure-sensitive adhesive) e.g. to an inner surface 103 of the housing. (Similarly, a layer 302 of an above-described damping material may be attached e.g. to an inner surface of the housing to dampen any vibration of the housing.)

In general, any sound barrier or deflector of any suitable type (e.g. one or more pieces of molded plastic, not necessarily being mass-loaded) may be provided within interior space 104 of regulator 100, for the purposes disclosed herein. One or more such barriers may serve as a partition or baffle that requires any airborne sound emitted within the interior of the regulator (e.g. emitted by the striker plate) to follow a more circuitous route in order to escape the regulator.

Another approach that may serve to reduce airborne sound leakage from the housing through openings in the regulator housing and/or to reduce vibrations of the housing that emit airborne sound into the ambient environment is to provide a sound-absorbing material (e.g. a porous, fibrous or foam material) within interior space 104 of regulator 100. A sound-absorbing material is defined herein as a material that exhibits a sound-absorption coefficient of at least 0.60 at 1000 Hz (measured via impedance tube testing according to the procedures outlined in U.S. Pat. No. 6,977,109). A sound-absorbing material 303 is depicted in generic, exemplary representation in FIG. 8. In this case the sound-absorbing material is in the form of a sheet-like layer 303 that is positioned on (e.g. attached to) an inner surface 103 of the regulator housing. However, such a sound-absorbing material can be provided within interior space 104 at any location and in any suitable manner. For example, in some embodiments a fibrous sound-absorbing material may be disposed within space 104 as one or more pieces that are inserted into this space in the same manner that similar materials are disposed within earcups of noise-reducing earmuffs.

Although sound-absorbing materials typically do not directly block the transmission of airborne sound (such a material is unreflective to airborne sound, rather than being a barrier to through-transmission of airborne sound) such a material may still be useful in the present application. For example, the presence of a sound-absorbing material within interior space 104 of the regulator housing can minimize the degree to which any airborne sound that is emitted by striker plate 230 can reverberate within the interior space 104 of regulator 100 to eventually escape therefrom. Such a material may also minimize the degree to which any airborne sound that is present within the regulator can drive the housing of the regulator to cause the housing itself to vibrate to emit airborne sound into the ambient environment. In other words, the presence of sound-absorbing material within the interior space 104 of the regulator can minimize any tendency for the striker plate, the air within the regulator, and the regulator housing, to form a mass-spring-mass resonator that causes the regulator housing to undergo sympathetic vibration (driven by the striker plate via the intervening air) to emit airborne sound into the ambient environment. As noted earlier herein, in some instances other items (e.g. plunger 220 and/or manifold body 210) in addition to striker plate 230 may emit some amount of airborne noise. In such cases, any of the herein-described approaches and arrangements may be applied to these items as well.

Promotion of Solid-Borne Vibration

The discussions above have concerned ways in which the emission of airborne sound from the regulator into the ambient environment can be minimized. In some embodiments, it may be advantageous to enhance the transmission of solid-borne vibration into facemask 1. It is noted that this may not necessarily be required. For example, in some instances the above-described arrangements e.g. as pictured in FIGS. 4-7 may provide a sufficient vibrational tactile signal without necessarily needing any modifications to enhance the signal. However, if the solid-borne vibration can be enhanced, this may make it possible to perform more aggressive modifications to decrease the emission of air-borne sound into the ambient environment, while still maintaining adequate solid-borne vibration.

As alluded to earlier, promoting the transmission of solid-borne vibration into the facemask will involve enhancing the vibrational coupling of the alert device to a face-contacting component of the facemask. At the least, this can involve ensuring that there are no air gaps between any components or items along the solid-borne vibrational pathway. This can also involve providing that only a minimal number (e.g. zero, or only as many as may be necessary for proper functioning of the regulator) of "lossy" items such as gaskets, seals or the like are present in the solid-borne vibrational pathway.

Beyond this, other arrangements can be used to enhance the transmission of solid-borne vibrations from the alert device to a face-contacting component of the facemask, e.g. by purposely providing an enhanced vibration-transmissive pathway that passes through a rear portion (e.g. portion 102 as shown in FIG. 8) of the housing of regulator 100. In one example, a portion of striker plate 230 may extend generally rearward so as to contact an inward (front) surface of rear portion 102 of the regulator housing. Similarly, a vibration-transmissive member (e.g. a dedicated item specifically provided for this purpose) of facemask 1 may similarly be in contact with the outward (rear) surface of rear housing portion 102. This vibration-transmissive member may then be in contact with, or may be a part of, a face-contacting component (e.g. nosecup 3) of the facemask. Such an arrangement can provide the desired enhanced vibration-transmissive pathway.

In some embodiments, the rear portion 102 of the regulator housing can comprise an acoustical "window" to facilitate this. By a window is meant a local area of the rear housing portion that exhibits a thickness that is less than 50% of the thickness of the area of the housing portion adjacent the window. In some such embodiments, such a window may take the form of a through-slot 304 that extends completely through the thickness of the housing portion. In such embodiments, a portion of striker plate 230 may extend generally rearward through slot 304 so that this portion of striker plate 230 contacts e.g. nosecup 3. (In other words, in some embodiments the striker plate can be configured so that it directly contacts the component of the facemask, e.g. the nosecup, that is to be vibrated.)

Alternatively, such a portion of striker plate 230 may extend through slot 304 and contact a vibration-transmissive member of facemask 1, which member is in contact with e.g. nosecup 3. Or, facemask 1 may be configured with a vibration-transmissive member that, when regulator 100 is installed on facemask 1, extends generally forwardly into and through slot 304 to contact striker plate 230. In some embodiments, a portion of striker plate 230 may meet, and contact, a vibration-transmissive member within slot 304. In some embodiments a coupler 107 of the facemask (or the nosecup 103, or some other component of facemask 1) may comprise a generally forwardly-extending portion that, when regulator 100 is coupled to facemask 1, protrudes into the interior of regulator 100 to serve as the striker plate of the vibrating alert device. Any such arrangements are possible, noting that such arrangements must be compatible with whatever scheme is used to mount the regulator on the facemask. For example, if the regulator is secured onto the facemask by twisting, the components must not interfere with this.

In some embodiments, a portion of striker plate 230 may be in direct contact with a coupler of the regulator (e.g. a coupler of the general type exemplified by item 107 as shown in FIG. 3. The fastening of coupler 107 of regulator 100 to complementary coupler 6 of facemask 1 (as visible in FIGS. 1 and 2) can then establish the desired vibration-transmissive pathway (with coupler 107 being in contact with e.g. nosecup 3). In a variation of this, a portion of striker plate 230 may extend rearward beyond coupler 107 (e.g. through orifice 306 as visible in FIG. 8) to directly contact coupler 6 of facemask 1. In a further variation, a portion of striker plate 230 may extend beyond coupler 107 so as to directly contact nosecup 3 of facemask 1. It is noted that all of the arrangements disclosed above are representative examples; any such approach or combination thereof may be used.

The approaches disclosed herein are concerned with acoustically isolating a mask-mounted regulator (in particular, a pneumatic vibration alert device thereof), from the surrounding atmospheric environment. That is, these approaches seek to minimize the emission of airborne sound from the regulator while optionally enhancing a pathway along which the pneumatic vibrating alert device is vibrationally coupled to a face-contacting component of the facemask. In general, some such approaches may involve, or rely on, establishing an impedance mismatch between a solid component that is emitting airborne sound, and the air that is in contact with that component. In many cases the striker plate 230 will be the solid component that is emitting airborne sound that is to be minimized; however, in some cases other items (e.g. plunger 220 and/or manifold body 210) may also contribute at least somewhat to the emission of airborne sound. In some cases the housing of the regulator may be the solid component that is emitting airborne sound. In any of these instances, the impedance mismatch between such solid components and air may be increased to lower the efficiency with which the solid and air phases couple, so that the tendency to emit airborne sound is reduced. Such an impedance mismatch can be promoted by any of the approaches previously disclosed herein, or by any other approach. Such an approach might involve, for example, the use of an acoustic metamaterial at the interface between the two phases.

Such approaches may also rely on, for example, configuring the striker plate (and optionally, a vibration-transmissive member of the facemask to which the striker plate transmits the solid-borne vibrations) to serve as a waveguide that preferentially promotes the propagation of vibrational waves in a direction toward the facemask while minimizing the propagation of vibrational waves in other directions (in particular, in directions that cause airborne sound to be emitted).

While such approaches have been described above e.g. in terms of adding items (e.g. damping layers) e.g. to a striker plate, in some embodiments the composition of the striker plate itself (and/or the composition of at least the tip of a plunger that impacts the striker plate) may be modified for such purposes. For example, rather than the striker plate being a metal such as e.g. aluminum or steel as commonly employed, the striker plate may instead be some other composition, e.g. a material with higher damping characteristics than aluminum or steel. Similarly, a damping layer may be disposed on some other component (e.g. manifold body 210) of the alert device and/or of the regulator.

It is emphasized that any of the arrangements described above may be used, alone or in combination with other arrangements, to achieve the desired effect. It is noted that the objectives listed herein do not necessarily require that the user of the SCBA must receive an alert that is solely in the form of solid-borne vibration. Rather, in some embodiments the user may still be able to hear an audible, airborne signal. What is necessary is that such a signal is sufficiently muted that it meets the previously-disclosed sound-level criteria of exhibiting a sound pressure level of less than 50 dB at a 10 foot distance.

It will be apparent to those skilled in the art that the specific exemplary embodiments, elements, structures, features, details, arrangements, configurations, etc., that are disclosed herein can be modified and/or combined in numerous ways. In summary, numerous variations and combinations are contemplated as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). Although various theories and possible mechanisms may have been discussed herein, in no event should such discussions serve to limit the claimable subject matter. To the extent that there is any conflict or discrepancy between this specification as written and the disclosure in any document that is incorporated by reference herein but to which no priority is claimed, this specification as written will control.

What is claimed is:

1. A self-contained breathing apparatus (SCBA) facemask, comprising:

a facemask configured to be worn by a user, the facemask defining an interior volume adjacent the user's face when the facemask is donned by the user;

a mask-mounted regulator that is mounted on the facemask and that is configured to receive breathing air at high pressure and to deliver the breathing air into the interior region of the facemask at a low pressure that is lower than the high pressure;

a pneumatic vibrating alert device mounted in a housing of the regulator, wherein the pneumatic vibrating alert device is vibrationally coupled to at least one face-contacting component of the facemask and is acoustically isolated from the surrounding environment.

2. The SCBA facemask of claim 1 wherein the mask-mounted regulator and the facemask are configured-so that the regulator delivers the breathing air into a nosecup that is located within the interior volume of the facemask and further configured such that the facemask covers the nose and mouth of the user so as to deliver the breathing air thereto, and wherein the nosecup is the at least one face-contacting component of the facemask to which the pneumatic vibrating alert device is vibrationally coupled.

3. The SCBA facemask of claim 1 wherein the pneumatic vibrating alert device comprises a reciprocating plunger that is supported in an interior through-air path of a manifold body of the pneumatic vibrating alert device and a striker plate that is outside the manifold body, the pneumatic vibrating alert device being configured so that when the pneumatic vibrating alert device is activated, the plunger moves back and forth in a reciprocating manner so that a terminal end of the reciprocating plunger repeatedly strikes the striker plate causing the striker plate to undergo vibration that travels along a solid-borne vibration transmission path to the at least one face-contacting component of the facemask to which the pneumatic vibrating alert device is vibrationally coupled.

4. The SCBA facemask of claim 3 wherein at least a portion of a major surface of the striker plate is in contact with at least one layer of damping material.

5. The SCBA facemask of claim 4 wherein the damping material is an organic polymeric material.

6. The SCBA facemask of claim 4 wherein the at least one layer of damping material is in the form of two layers of damping material, one in contact with at least a portion of a first major surface of the striker plate, and the other in contact with at least a portion of a second major surface of the striker plate.

7. The SCBA facemask of claim 6 wherein the at least one layer of damping material is in the form of a sleeve of organic polymeric material that is slidably fitted onto at least a portion of a length of the striker plate.

8. The SCBA facemask of claim 4 wherein a layer of damping material is interposed between the striker plate and a housing of the mask-mounted regulator, at least at one location at which the striker plate closely abuts the housing of the mask-mounted regulator.

9. The SCBA facemask of claim 3 wherein the pneumatic vibrating alert device is vibrationally coupled to at least one face-contacting component of the facemask by way of a vibration-transmissive pathway that passes through a rear portion of the housing of the mask-mounted regulator.

10. The SCBA facemask of claim 9 wherein a portion of the striker plate is in contact with a forward surface of a vibration-transmissive window of a rear portion of the housing of the mask-mounted regulator, and wherein a portion of a vibration-transmissive member of the facemask is in contact with a rear surface of the vibration-transmissive window of the rear portion of the housing of the regulator.

11. The SCBA facemask of claim 9 wherein a portion of the striker plate extends through a vibration-transmissive window in the form of a through-slot in a rear portion of the housing of the mask-mounted regulator, so that at least some part of the extending portion of the striker plate is in contact with a component of the facemask.

12. The SCBA facemask of claim 3 wherein at least a portion of the striker plate is in direct contact with a coupler of the mask-mounted regulator, the coupler being configured to be connected to a complementary coupler of the facemask to allow the regulator to be attached to the facemask.

13. The SCBA facemask of claim 3 wherein the through-air path of the manifold body of the pneumatic vibrating alert device comprises an air inlet to which a downstream end of a delivery tube of the mask-mounted regulator is mated so that the air inlet of the manifold body is fluidly coupled to an air outlet of an air-holding chamber of the delivery tube of the mask-mounted regulator, and wherein the delivery tube of the mask-mounted regulator comprises a metering orifice that limits the rate at which breathing air can enter the air-holding chamber.

14. The SCBA facemask of claim 13 wherein the mask-mounted regulator further comprises a demand piston that is located in an air chamber that is upstream of the metering orifice in the delivery tube, the demand piston being configured to move back and forth along the delivery tube so as to open a breathing air path, and close a breathing air path, of the mask-mounted regulator, in response to inhalation and exhalation of a user of the facemask; and, wherein the demand piston comprises an air passage that extends along a long axis of the demand piston from an upstream end of the demand piston to a downstream end of the demand piston, so that breathing air can flow through the air passage and reach the metering orifice and the air-holding chamber regardless of the position of the demand piston.

15. The SCBA facemask of claim 1 wherein at least a portion of a housing of the mask-mounted regulator is a sound-barrier material that is an injection-molded mass-loaded organic polymeric material.

16. The SCBA facemask of claim 1 wherein at least at one location within an interior volume defined by a housing of the mask-mounted regulator, at least one mass-loaded organic polymeric sound-barrier layer is positioned between the striker plate and the housing of the mask-mounted regulator.

17. The SCBA facemask of claim 16 wherein the mass-loaded organic polymeric sound-barrier layer is disposed on an inward surface of the housing of the mask-mounted regulator.

18. The SCBA facemask of claim 1 wherein a sound-absorbing material is positioned at least at one location within an interior volume defined by a housing of the mask-mounted regulator.

19. The SCBA facemask of claim 1, and further comprising at least one tank of compressed breathing air that is fluidly connected to the mask-mounted regulator of the facemask.

20. The SCBA facemask of claim 19 wherein the regulator that is mounted on the facemask is a second-stage regulator and wherein the SCBA facemask further comprises a first-stage regulator that is in-line between the at least one tank of compressed breathing air and the mask-mounted regulator; wherein the first-stage regulator is a redundant-dual-air-pathway regulator that comprises a first air pathway configured to deliver the breathing air to the mask-mounted regulator at a first high pressure, and a second air pathway configured to deliver the breathing air to the mask-mounted regulator at a second high pressure that is higher than the first high pressure, and wherein the mask-mounted regulator and the pneumatic vibrating alert device are configured so that the pneumatic vibrating alert device is not activated by the mask-mounted regulator receiving breathing air at the first high pressure but is activated by the mask-mounted regulator receiving breathing air at the second high pressure.

* * * * *